United States Patent
Jacob et al.

(10) Patent No.: US 6,928,807 B2
(45) Date of Patent: Aug. 16, 2005

(54) METHOD AND APPARATUS FOR PRODUCING AMMONIA ($NH_3$)

(75) Inventors: Eberhard Jacob, Krailing (DE); Sebastian Käfer, Kircheimbolanden (DE); Werner Müller, Kaiserslautern (DE); Andreas Lacroix, Weidenthal (DE); Andreas Herr, Kaiserslautern (DE)

(73) Assignee: MAN Nutzfahrzeuge AG (DE)

( * ) Notice: Subject to any disclaimer, the term of this patent is extended or adjusted under 35 U.S.C. 154(b) by 0 days.

(21) Appl. No.: 10/369,348

(22) Filed: Feb. 14, 2003

(65) Prior Publication Data

US 2004/0040288 A1 Mar. 4, 2004

(30) Foreign Application Priority Data

Feb. 14, 2002 (DE) .......................................... 102 06 028

(51) Int. Cl.[7] ................................................ F01N 3/00
(52) U.S. Cl. .............................. 60/286; 60/274; 60/295; 60/301; 423/213.2; 423/239.1
(58) Field of Search .......................... 60/274, 286, 295, 60/301

(56) References Cited

U.S. PATENT DOCUMENTS

| | | | |
|---|---|---|---|
| 5,809,775 A | * | 9/1998 | Tarabulski et al. ............ 60/274 |
| 6,266,955 B1 | * | 7/2001 | Liang et al. ................... 60/274 |
| 6,361,754 B1 | * | 3/2002 | Peter-Hoblyn et al. ... 423/213.2 |
| 6,387,336 B2 | * | 5/2002 | Marko et al. ................ 423/212 |
| 6,399,034 B1 | * | 6/2002 | Weisweiler .............. 423/213.2 |
| 6,415,602 B1 | * | 7/2002 | Patchett et al. ............... 60/286 |
| 6,502,390 B2 | * | 1/2003 | Goerigk et al. ............... 60/286 |
| 6,601,385 B2 | * | 8/2003 | Verdegan et al. ............. 60/286 |

* cited by examiner

Primary Examiner—Thomas Denion
Assistant Examiner—Diem Tran
(74) Attorney, Agent, or Firm—Robert W Becker & Associates; Robert W Becker (57) ABSTRACT

A method is provided for producing ammonia ($NH_3$) and introducing the produced ammonia ($NH_3$) into an exhaust gas stream as a reduction means for selectively catalytically reducing nitrogen oxides contained in the exhaust gas stream, which is an exhaust stream generated by the combustion process of a motor, a gas turbine, or a burner. The method comprises feeding dry urea from a supply container in a controlled amount to reactor and subjecting the dry urea in the reactor to a sufficiently rapid thermal treatment such that a gas mixture comprising the reaction products of ammonia ($NH_3$) and isocyanic acid (HCNO) is created. Also, the method comprises immediately catalytically treating the thus produced gas mixture in the presence of water such that the isocyanic acid (HCNO) resulting from the rapid thermal treatment is converted, via quantitative hydrolysis treatment, into ammonia ($NH_3$) and carbon dioxide ($CO_2$).

22 Claims, 2 Drawing Sheets

METHOD AND APPARATUS FOR PRODUCING AMMONIA ($NH_3$)

BACKGROUND OF THE INVENTION

The present invention relates to a method and an apparatus for producing ammonia ($NH_3$) and introducing the produced ammonia ($NH_3$) into an exhaust gas stream as a reduction means for selectively catalytically reducing nitrogen oxides contained in the exhaust gas stream, which is an exhaust stream generated by the combustion process of a motor, a gas turbine, or a burner.

Ammonia ($NH_3$) serves in the above-noted applications of interest as a reduction means which is introduced, as viewed relative to the exhaust gas flow, upstream of a special SCR catalyzer or catalytic converter, or upstream of an integrated group of SCR catalyzer modules, disposed for exhaust gas flow therethrough in a parallel manner, built into a muffler in the exhaust gas conduits of internal combustion engines, gas turbines, or burners or introduced into SCR catalyzer systems in which a reduction of the nitrogen oxides contained in the exhaust gas is effected. The term "SCR" means selective catalytic reduction.

Various conventional methods are known for the production of ammonia ($NH_3$) which are discussed in detail below.

EP 0487886 A2 proposes a method for a quantitative disassociation, via hydrolysis, of an aqueous urea solution into ammonia ($NH_3$) and carbon dioxide ($CO_2$) in a temperature range of 160° C. to 550° C., in which, in the resultant product, undesired reaction products such as isocyanic acid (HCNO) and carbon monoxide (CO) can be avoided. In this known method, the urea solution is initially sprayed via a spray nozzle onto a vaporizer/catalyzer disposed in the exhaust gas stream. The gas-forming products which are produced thereby are subsequently treated in a hydrolysis catalyzer before they are conducted through an SCR catalyzer for the reduction of nitrogen oxides therein.

EP 0555746 A2 discloses a method which enhances the method disclosed in EP 0487886 A2. Namely, the method disclosed in EP 0555746 A2 is enhanced in that the vaporization element thereof is configured such that the urea solution is handled in a homogeneous manner and distributed so as to ensure contact of the drops with the channel walls. The deposition of deposits onto the catalyzers and urea slip is avoided due to a homogeneous distribution. The urea dosing should only be active at an exhaust gas temperature above 160° C., since undershooting this temperature forms undesired byproducts.

A disadvantage of the aqueous urea solution is that its production is, by reason of the necessity of de-ionized water, comparatively expensive. De-ionized water is required to continuously protect the catalyzer surfaces from the deposition thereon of lime. Due to the high water portion of the urea solution (32.5% solution), the disadvantages of a significantly higher weight and larger facility volume must be dealt with in connection with such a solution, in comparison to dry urea or a mixture of urea with a reduced water portion.

A further disadvantage of the aqueous urea solution obtains with respect to its fitness for winter conditions. The freezing point of a 32.5% urea solution is −11° C. In the event of very low temperatures, the supply container and the dosing system must be heated. Moreover, in order to achieve the vaporization of the urea solution, 80% of the energy dedicated to the process must be allocated for such vaporization. This leads to a lowering of the exhaust gas temperature and, consequently, in the event of low temperatures under certain conditions, to a reduced conversion of nitrogen oxides.

EP 0615777 B1 proposes, in lieu of an aqueous urea solution, dry urea as the reduction means for SCR technology, in the form of prills with a diameter up to 5 millimeters or micro-prills with a diameter between 10 and 1,000 microns. The -prills are injected into the exhaust gas conduit by means of a dosing injection apparatus with the assistance of pressurized air. The danger exists, in connection with the deployment of dry urea, that the micro-prills are baked to one another or, respectively, adhere to one another. The flow capability of the micro-prills must be maintained to avoid deterioration of the dose injection. It has been suggested to deploy packing of micro-prills sealed against air or the dusting or powder application of micro-prills with organic nitrogen compounds.

EP 0878608 A2 discloses a melt product of pure urea as a reduction means for selective catalytic or non-catalytic nitrogen oxide reduction. The dry urea is initially present in the form of powder or in crystalline form and stored in a supply container. A predetermined amount of urea is fed to the heat transfer element via a feed worm as a function of the load of the motor and its rate of rotation. The heat transfer element, over which flows an exhaust gas stream, exploits the exhaust gas heat content to effect fluidizing of the solid urea. This process takes place at temperatures between 133° C. (the melting temperature of urea) and 250° C. It is desired to run the process at temperatures only up to 160° C. in order to avoid undesired byproducts such as, for example, cyanuric acid. The resulting melt product comprises the actual reduction means, ammonia ($NH_3$), and, upon occasion, isocyanic acid (HCNO). The melt product is injected via a high-pressure spray pump through one or several injection nozzles into the exhaust gas. The location of the injection is, in SCR processes, immediately before the catalyst and, in connection with non-catalytic processes, immediately before the burner space.

U.S. Pat. No. 5,809,775 discloses converting by heating a solid suitable for $NO_X$ reduction in a gas generator into an ammonia ($NH_3$)-containing gas. In this connection, the preferred $NO_x$ reduction means, urea, is heated to at least 300° C. via treatment by pyrolysis, wherein other reduction means, such as, for example, ammonium carbamate, need only be heated to 40° C. The ammonia ($NH_3$)-containing gas is subsequently introduced into contact with the exhaust gas via an injection nozzle. The gas/exhaust gas mixture is then conducted through an SCR catalyzer. U.S. Pat. No. 5,809,775 discloses a comprehensive system which, building on the possibilities of providing a supply of the solid reduction means in a container with an outlet, offers further possibilities to heat the reduction means in a container, to produce the ammonia ($NH_3$)-containing gas, and, subsequently, to conduct the gas to the exhaust gas and to conduct the gas/exhaust gas mixture through the SCR catalyzer. In one embodiment, the container for the supply and for the pyrolysis process are placed under pressure.

U.S. Pat. No. 5,968,464 discloses a method and an apparatus for $NO_X$ reduction in which an aqueous urea solution is sprayed onto a heated surface of a pyrolysis chamber, which comprises an outlet opening for the discharge therethrough of the gas-forming products of the urea pyrolysis and the water vaporization. In this connection, the solution remains in contact with the heated top surface of the pyrolysis chamber until the urea has been completely pyrolically treated and the water has been vaporized. The gas-forming reaction products are conducted to the exhaust gas system for selective catalytic reduction thereof at a suitable temperature.

WO 98/42623 discloses a method and an apparatus for the reduction of nitrogen oxide. In a preferred version, an aqueous urea solution with a concentration of about 10% to 50% by mass of urea is sprayed into a pyrolysis chamber. This reactor has its typical operational temperature at between 125° C. and 180° C. and an operational gas pressure of about 20 psig to 200 psig. The residence time of the reactive fluid in the reactor is selected such that the gas-forming reaction product, which is comprised of ammonia ($NH_3$), carbon dioxide ($CO_2$), and water vapor, is removed under controlled pressure and mass flow conditions from the chamber and, consequently, is maintained at at least 60° C. Viewing the entire range of possibilities, a urea concentration of 1% to 77% is used, the temperatures are at about 110° C. to 300° C., and the operational gas pressures are at 30 psig to 500 psig. The temperature and gas pressure are controlled via the introduction of heat into the reactor.

JP 63198713 A discloses a method in which nitrogen oxide is removed from the exhaust gas of diesel motors. In accordance with this known method, the exhaust gas is mixed together with ammonia ($NH_3$), which is formed by the reaction of urea and water. The exhaust gas is brought into contact with a $TiO_2$—catalyzer.

DE 19903439 A1 discloses a method for the dosing of reduction means in which the basic amount of reduction means to be dosed is determined by the magnitude of the load and at least one further operational parameter such as, for example, the rotational speed. Moreover, the dosing amount is adjustable as a function of at least one further operational parameter, such as, for example, the exhaust gas temperature.

DE 19901915 A1 suggests a dosing strategy for exploiting the reduction means storage capability of an SCR catalyzer, in which the reduction means is dosed up to a limit which results in an over stoichiometric dosage of the reduction means. Thereafter, the dosing is terminated or is further continued but at an under-stoichiometric rate. The advantage of the process is found in a higher average nitric oxide conversion, especially during varying operational conditions.

DE 19855385 A1 discloses a reduction means dosing and vaporization apparatus in which the reduction means is introduced via a (heated) nozzle located on the exhaust gas conduit. Due to the heating of the nozzle to 300° C. to 360° C., the reduction means is substantially vaporized.

In order to promote the conversion of urea into ammonia ($NH_3$), it is proposed, in DE 19913462 A1, to deploy a reactor into which a portion of the exhaust gas stream—a partial exhaust gas stream—is conducted. A reduced flow speed is present in the partial exhaust gas stream as compared to the full exhaust gas stream and, consequently, the residence time of the urea introduced into the reactor is correspondingly greater and more time is available for chemical conversion.

DE 19922959 A1 discloses an exhaust gas cleaning apparatus in which the reduction means is introduced in vaporized form into a nitrogen oxide reduction catalyst. The vaporizer comprises, as a heat source, a baffle, which can be heated, onto which the fluidized reduction means is disposed under pressure. In order to convert the urea into ammonia ($NH_3$), the baffle surface can be coated with a catalytic material. The introduction by dosing of the reduction means can follow thereafter by introduction of the reduction means into the principal exhaust gas stream or in a partial exhaust gas stream branched from the principal exhaust gas stream.

DE 19949296 A1 discloses a heating apparatus for a reduction means pressure body, which is connected to a gas collection space. The gas-forming reduction means which is produced thereby is introduced via a spray valve into a reaction chamber disposed in the exhaust gas stream for thermal conversion of the reduction means in the reaction chamber. The reaction chamber is communicated into the exhaust gas conduit.

SUMMARY OF THE INVENTION

The present invention provides a solution to the challenge of providing a method and an apparatus in which ammonia ($NH_3$) is produced in an advantageous manner from solid urea and the thus produced ammonia ($NH_3$) is available for introduction into a further processing step as a reducing means.

With respect to the development of the invention, several considerations came to mind and these are described hereinafter in greater detail. As a reference base in this connection, a mobile system such as a motor vehicle, was posited which produces, via combustion, exhaust gas, which, to achieve compliance with possible future legally mandated exhaust gas limits, would be subjected to catalytic treatment. In designing a motor vehicle, certain design goals which are in conflict with one another must nonetheless be brought into a resolution, whereby the fuel consumption characteristics, the performance characteristics, and the emissions characteristics present partially conflicting design goals. In attempting to improve the fuel usage characteristic of the motor, the conditions for the after treatment of exhaust gas produced by the motor becomes continuously more difficult in that the exhaust gas temperature level diminishes. In contrast, the $NO_X$—emissions of the motor increase, as a consequence of the rise of the combustion peak temperature. In connection with diesel motors or lean operated spark ignition motors, typically lean exhaust gas conditions require a reduction means to effect the $NO_X$ reduction, whereby, for the vehicle deployment, the use of SCR catalyzer technology, in which urea is converted into ammonia ($NH_3$) forming reduction means, is favored.

The ammonia ($NH_3$) required for the catalytic reduction is formed by the thermal decomposition of urea. In this connection, the following reactions are relevant:

The thermal treatment of urea leads to ammonia ($NH_3$) and isocyanic acid (HCNO).

$$(NH_2)_2CO \rightarrow NH_3 + HNCO$$

The isocyanic acid (HCNO), in the presence of water, is converted by hydrolysis into ammonia ($NH_3$) and carbon dioxide ($CO_2$).

$$HNCO + H_2O \rightarrow NH_3 + CO_2$$

In connection with motor vehicles using known urea SCR catalytic systems, the heat content of the motor exhaust gas is, typically, fully exploited to effect thermal decomposition of urea. The thermal treatment can principally be performed before the operation of the catalyzer while the hydrolysis treatment is performed in the gas phase only by the SCR catalyzer or by a hydrolysis catalyzer with a substantial operational speed, whereby, in particular, the hydrolysis treatment leads to a delayed release of ammonia ($NH_3$). This means that, without a hydrolysis reaction, at a maximum 50% of the $NH_3$ amount stored in the urea is available for introduction into the SCR catalyzer. In connection therewith, due to the space relation of the dosing parts for dose injection of the reduction means, the introduction of the reduction means typically must be provided at a location immediately before the SCR catalyzer, whereupon the period of time which is available for decomposition is very limited. This limitation, especially, in connection with a high space velocity in the exhaust gas, leads to problems as a large portion of the reduction means is first prepared in the catalyzer and some of this so-prepared portion of the reduction means exits the catalyzer in the form of slippage.

The problem of preparation of the reduction means is, for example, in connection with passenger vehicle usage, further sharpened due to the condition that a passenger vehicle diesel motor is substantially driven in the partial-load region and the exhaust gas temperature level is, correspondingly, comparatively low. On the one hand, due to the low exhaust gas temperatures, no spontaneous and complete urea decomposition is accomplished—that is, in this range, the decomposition kinetic operates as a conversion-limiting parameter. On the other hand, the heat, which is withdrawn from the exhaust gas for the thermal decomposition of the urea, leads to a further reduction of the anyway already low temperature level—that is, the activity of the catalyzer is limited or reduced under these conditions. This disadvantage is particularly clear in connection with an aqueous urea solution with, for example, 32.5% by weight of urea, as a considerably large heat content amount is required for the vaporization of water.

Due to the above-noted reasons, an exhaust gas after treatment system in which the reduction means in the form of ammonia ($NH_3$), such as is provided by the invention, is introduced in gas form into the exhaust gas stream of the motor, offers enormous advantages. Also, the danger of undesired ammonia ($NH_3$) slip is significantly reduced as compared with the introduction of an aqueous urea solution.

Since the storage of gas-forming ammonia ($NH_3$) is, typically, very problematic and, in particular with respect to a motor vehicle, cannot, from a security point of view, even be considered, a method is proposed, in accordance with the present invention, by which the urea decomposition process—a process decoupled from the exhaust gas system—is conducted in a special decomposition apparatus. In this connection, there would have been basically two possibilities available with respect to the urea—namely, the possibility of introducing the urea either in a dry solid body form or in the form of a urea solution. In order to validate these two possibilities from the perspective of their fitness for mass production, thermodynamic calculations were performed to provide estimates of the heat content amounts which are required for the thermal decomposition of urea-liquid mixtures or, respectively, dry urea. In this connection, it was shown that, for the pure thermal treatment of a urea-liquid mixture, a relatively greater heat content amount is required than that required for the thermal hydrolysis process (thermal treatment and hydrolysis treatment). This is attributable to the fact that the thermal treatment is an endothermic reaction and the hydrolysis treatment is an exothermic reaction.

A further important influence factor is that the portion of water in the mixture is considerable, as a considerable heat content amount is required for the heating up and vaporization of the water. In this connection, a mixture with a urea mass portion of 76.9% can be recommended as such a mixture comprises only that water amount which is required for the thermal hydrolysis treatment—that is, no excess water need be heated. Although, in this thermal hydrolysis treatment, the vaporization heat for the water must be introduced, the required heat content is less in comparison to the thermal treatment of dry urea. To be sure, a urea-water mixture with a urea portion of more than 60% exhibits a reduced long term stability and is, therefore, not suitable for use as a reduction means. It was ultimately discovered that, from an energy perspective, it is most favorable in each instance in which a dry urea is thermally decomposed that, for the subsequent hydrolysis process, water such as, for example, water contained in an exhaust gas branch stream, is used since, in this regard, the heat content amount which would otherwise be required for vaporization of the urea water solution need not be provided. Additionally, the dry urea offer the further advantages of an unlimited fitness for winter conditions and the largest possible stored ammonia ($NH_3$) mass available for the reduction means mass.

The selected decomposition temperature is, with respect to the inventive method, a parameter of central importance as, in certain temperature ranges, undesired reaction products occur.

Based upon thermo-gravimetric investigations, it has been determined that the thermal treatment of dry urea at a temperature above 400° C. forms solely gas-forming reaction products. Further investigations have shown that, by the use of a hydrolysis catalyst, the thermal reaction can also be catalyzed, whereby such permits the decomposition temperature for the urea to be reduced to a value of 200° C.

Based upon the results and knowledge so derived, the decomposition temperature for the urea in the noted temperature range is chosen such that, with due regard to the energy aspects, an optimal thermal hydrolysis result is achieved—that is, in connection with the urea decomposition reaction, substantially only ammonia ($NH_3$) and carbon dioxide ($CO_2$) are formed.

A further important perspective, which exerts a decisive influence on the energy balance, is the flow of the water mass into the reactor in which the hydrolysis treatment is to take place. Most preferably, this flow of the water mass is effected as the water component of an exhaust gas branch stream branched from an exhaust gas main SCR and introduced into the reactor. In this connection, the following factors should be taken into account. If the exhaust gas temperature lies below the set decomposition temperature for the urea, the exhaust gas branch stream is structured at an order of magnitude such that the water amount conducted into the reactor is only that water amount necessary for the stoichiometry of the hydrolysis reaction, as in this event an electric heating operation for heating up of the exhaust gas branch stream is required. On the other hand, if the exhaust gas temperature lies above the set decomposition temperatures, larger exhaust gas streams can be introduced into the reactor as, in this event, a heat flow is introduced via the exhaust gas which effects a reduction of the electric heating operation for rapid thermal treatment of the urea. The upper limit in this connection is set by the reaction kinetic of the urea decomposition and hence by the residence time or, respectively, the space velocity in the reactor. The catalyzed hydrolysis treatment is favored by the stoichiometric relationship—that is, the water amount required for hydrolysis treatment of the isocyanic acid (HCNO), which is representative of the water amount to be thus introduced via the exhaust gas branch stream, can be limited toward the upper end.

In dependence upon the actual reduction means requirement of the exhaust gas after treatment system, the above-described decomposition process is implemented via a continuous or, respectively, a discontinuous, introduction of urea into the reactor. The discontinuous production and introduction of the reduction means ammonia ($NH_3$) for the purpose of reducing the nitrogen oxide in the exhaust gas from the internal combustion engine is thus possible because the SCR catalysts comprise an exhaust gas temperaturedependent storage capacity relative to the ammonia (NH₃) produced from the urea decomposition.

The reduction means ammonia (NH₃) produced via the inventive method and the inventive apparatus, is introduced at suitable locations into the exhaust gas system of a motor, a gas turbine, or a burner, and, in fact, is introduced upstream of an SCR catalyzer or upstream of several SCR catalyzers, built into a muffler and disposed for exhaust gas flow therethrough in a parallel manner, the respective catalyzer or catalyzers effecting a reduction of the nitric oxide contained in the exhaust gas. Since, in the event of the deployment of ammonia (NH₃) in connection with internal combustion engines as a reduction means, exclusively ammonia (NH₃) produced immediately prior to its introduction is exclusively introduced into the exhaust gas, the activity of the SCR catalyzer system in connection with a cold internal combustion engine, and in connection with the warming up of the internal combustion engine, is decidedly improved, in comparison to those other methods in which urea would be bound into an exhaust gas stream as a solution or as a powder, for the reason that the fill condition of the ammonia (NH₃) amount stored in the SCR catalyzer system can already be brought to a level favoring a rapid initiation of the nitrogen oxide reduction immediately following the start up of the cold internal combustion engine.

In connection with the inventive process, the desired reduction means ammonia (NH₃) is, via deployment of the inventive apparatus, generated in the reactor by a spontaneous thermal decomposition of solid urea in the presence of water (a rapid thermal treatment), the spontaneous thermal decomposition being effected by the introduction of electric energy into the reactor. In a first reaction step, the thermal treatment decomposes the urea into ammonia (NH₃) and isocyanic acid (HCNO). In connection with the thereon-following hydrolysis treatment, the isocyanic acid (HCNO) reacts with the water which, for example, originates as a product from the combustion process of a motor and is fed to the reactor, whereupon ammonia (NH₃) and carbon dioxide (CO₂) are formed. Since this hydrolysis treatment, in the gas phase, unfolds at too low a speed without catalytic support, a catalyzer with a suitable catalytic coating (for example, aluminum oxide Al₂O₃ or titanium oxide TiO₂) is deployed. The gas-forming product generated thereby, which, ideally, is comprised only of ammonia (NH₃) and carbon dioxide (CO₂), is deployed as a reduction means in the exhaust gas to be cleaned of an internal combustion engine, a gas turbine, or a burner. The reduction means reacts in an SCR catalyzer system with the nitrogen oxide contained in the exhaust gas into primarily molecular oxygen and water.

The hydrolysis treatment performed in the execution of the inventive method is, in two respects, an essential reaction step. On the one hand, the very reactive isocyanic acid (HCNO) exhibits a tendency toward condensation and forms polymerization products (for example, biuret, triuret, cyanuric acid) which would appear in the form of fixed deposits deposited on the inventive apparatus, whereby the operational reliability of the system could no longer be ensured. On the other hand, in connection with the hydrolysis treatment, the treatment involves an exothermic reaction, in that it delivers a heat contribution to reduce the input required for the heating up steps.

The inventive method can be used in mobile or stationary capacities which turn to the use of an internal combustion engine such as a diesel motor or a lean-fuel operating spark ignition motor or a gas turbine or a burner. The burner can be comprised as a component of a heat producing portion which produces heat. The internal combustion engine can be the drive component of all types of land motor vehicles including rail-mounted vehicles, aircraft, and water-borne transportation means.

BRIEF DESCRIPTION OF THE DRAWINGS

The inventive method and the inventive apparatus are described hereinafter with reference to an embodiment of the invention having reference to the figures of the drawings, in which.

DETAILED DESCRIPTION OF THE PREFERRED EMBODIMENT

Figure 1:
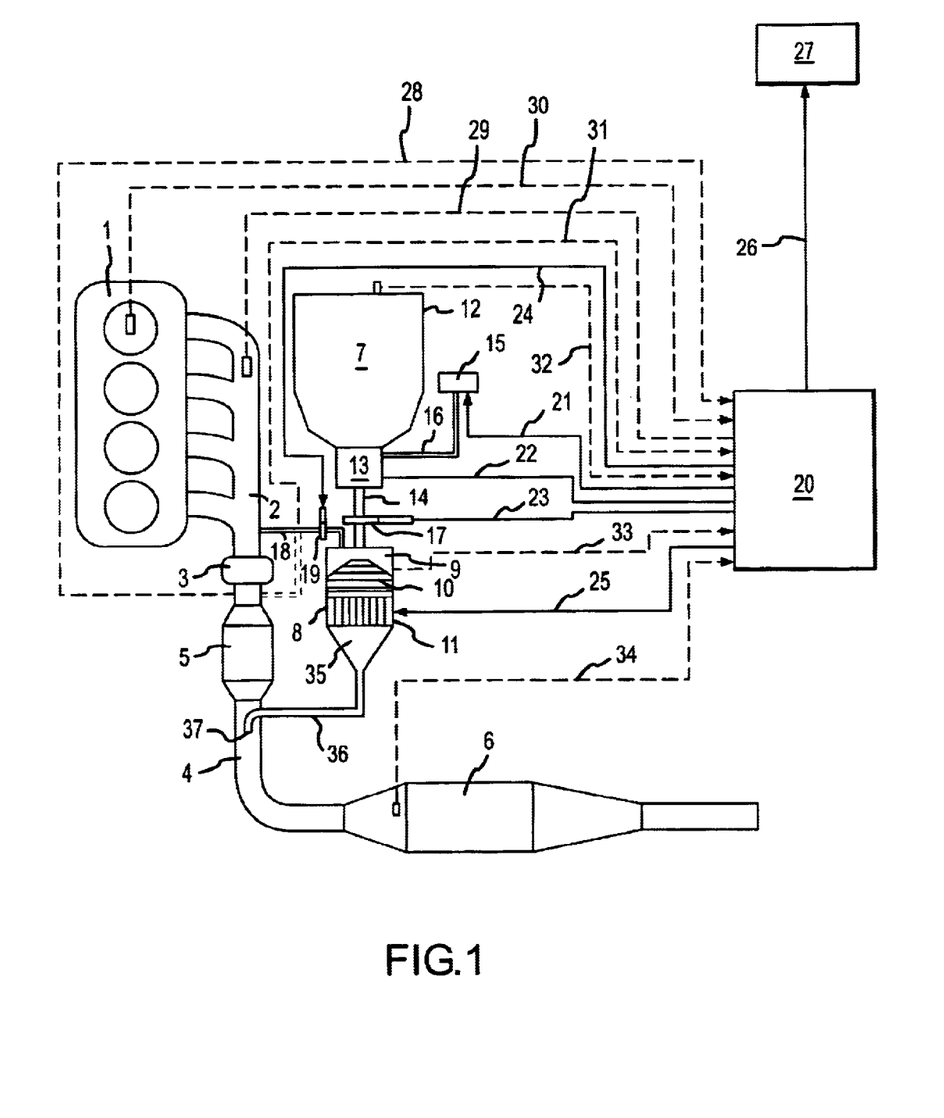
FIG. 1 is a schematic view of an internal combustion engine of, for example, a motor vehicle, having an exhaust gas flow and an embodiment of the apparatus of the present invention disposed handling the exhaust gas flow in accordance with the method of the present invention.

FIG. 1 shows an example of an arrangement in which the exhaust gas produced therefrom is to be subjected to a follow-on exhaust gas handling or treatment, the arrangement being comprised of an internal combustion engine 1 which is the drive source for, for example, a motor vehicle or a stationary facility. The exhaust gas of the internal combustion engine 1 flows along an exit path initially through outlet channels, thereafter through an exhaust gas manifold communicated with the outlet channels, and subsequently into an exhaust gas collection conduit 2 which is connected to the turbine 3 of a not-further described exhaust gas turbocharger. The outlet of the turbine 3 is communicated with an exhaust gas conduit 4 on which is disposed, at a location adjacent the turbine, a pre-catalyzer 5 and located downstream from the pre-catalyzer 5 is an SCR catalyzer 6 or several SCR catalyzers, built into a muffler and disposed for exhaust gas flow therethrough in a parallel manner. The pre-catalyzer 5 is an oxikat which, in addition to its function of oxidizing carbon monoxide (CO) and hydrocarbons in the exhaust gas system, also has the function of significantly raising the portion of $NO_X$ in the exhaust gas. For this reason, the pre-catalyzer 5 is, taking into account its volume and its temperature window, positioned in the exhaust gas flow such that it can generate the requested or, respectively, the necessary, $NO_X$ portion for the optimum temperature region in the SCR catalyzer 6. The reduction of the nitrogen oxide contained in the exhaust gas is accomplished in the SCR catalyzer 6.

An embodiment of the apparatus of the present invention is associated with an exhaust gas producing facility such as described hereinabove for producing ammonia (NH₃) which can be introduced, in the exhaust gas stream generated by the combustion process of the machine 1 (or a gas turbine or a burner), immediately following its production as a reduction means for effecting the selective catalytic reduction of the nitrogen oxide contained in the exhaust gas stream.

The apparatus of the present invention is comprised of the following principal individual features:

- a storage container 7 in which urea in dry form in the form of powder, granulate, or micro-prills is stored, and
- a reactor 8 for the production of ammonia (NH₃) with an electrically heated reaction chamber 9 which is partitioned into a thermal treatment zone and a hydrolysis treatment zone, and
- a device for feed of the urea from the supply container 7 in controlled or measured amounts into the reaction chamber 9 of the reactor 8, and an electric heating element 10 in the thermal treatment zone of the reaction chamber 9 of the reactor 8, and a device for controlling the temperature of the electric heating element 10 in a manner such that the urea introduced into the reaction chamber 9 is spontaneously de-composeable, via a rapid thermal treatment, into ammonia ($NH_3$) and isocyanic acid (HCNO), and a device for introducing water or a water-containing gas into in the reaction chamber 9 of the reactor 8, in which the exhaust gas stream from the combustion exhaust gases of the machine 1 or, respectively, an exhaust gas stream from a gas turbine or a burner, can be treated, and a hydrolysis catalyzer 11 in the hydrolysis treatment zone of the reaction chamber 9 of the reactor 8 for converting, in the presence of water, the isocyanic acid (HCNO), which is produced from the rapid thermal treatment of the urea in addition to ammonia ($NH_3$), into ammonia ($NH_3$) and carbon dioxide ($CO_2$).

The hydrolysis catalyzer 11 is dimensioned such that a quantitative conversion of the isocyanic acid (HCNO) into ammonia ($NH_3$) and carbon dioxide ($CO_2$) is possible.

The supply container 7 is isolated against the influences of moisture and high temperatures. In this manner, it can be prevented that the stored urea either melts or, by reason of its hygroscopic properties, adheres together.

A filling condition sensor 12 is integrated into the supply container 7 for monitoring the supply-ready fill condition of the urea and this supply-ready fill condition of the urea can be determined via a device 27 which permits a visual evaluation of the actual supply-ready fill condition or provides a graphic representation of the actual supply-ready fill condition or which may optionally provide—if a minimum condition is reached—an acoustic indication of the actual supply-ready fill condition in the form of a warning signal. If such a signal is produced, the urea supply reserve in the supply container 7 must be replenished.

A dosing device 13 is oriented relative to the supply container 7 for injecting urea, with the assistance of a transport air stream, in a dosed manner from the supply container 7 into a feed conduit 14 for feed of the urea therefrom into the reaction chamber 9 of the reactor 8. The dosing device 13 is disposed at a spacing from the reactor 8, which has its reaction chamber 9 at a temperature between 200° C. and 450° C., at a spacing such that the dosing device is thermally decoupled from the reactor so as to avoid a melting of the urea in the dosing device 13 and an attendant stoppage or adhering together of the urea contained therein. This thermal decoupling of the dosing device 13 is supported by a cold transport air stream which assists in the transport of the urea through the feed conduit 14. This transport air stream can be produced by, for example, an electrically driven pump 15, or from an available pressurized air source, and can be conducted to the dosing device 13 via a feed conduit 16.

In view of the sensitivity of the supply and dosing system relative to the moisture influences, which result from the hygroscopic property of the urea, the inventive apparatus can be enhanced by the provision of a blocking valve 17 disposed in the feed conduit 14 between the dosing device 13 and the reactor 8, with the blocking valve preferably being controllable in an electromagnetic manner and being moveable into a blocking condition in the feed conduit 14 in certain operational conditions including, especially if no production of ammonia ($NH_3$) is necessary or desired, to thereby preclude a penetration of water or moisture from the reaction chamber 9 of the reactor 8 into the dosing device 13.

In addition to the urea, an exhaust gas branch stream is, in the above-noted example, introduced as a water-containing gas into the reaction chamber 9 of the reactor 8 and is, in fact, introduced via a feed conduit 18, which is disposed as close as possible to the motor, extending either from the exhaust gas collecting conduit 2 at a location upstream of the exhaust gas turbine 3 or downstream of the exhaust gas turbine 3 and upstream of the exhaust gas conduit 4 (shown in broken lines in FIG. 1) branching from the pre-catalyzer 5. As a rule, the pressure gradient at a location upstream of the pre-catalyzer 5 is sufficient in order to make available an adequate amount in the exhaust gas branch stream. For the water needed for the hydrolysis treatment of the isocyanic acid (HCNO), however, other means such as, for example, a donor source, can be made available such that water can be fed via a feed conduit into the reaction chamber 9. A blocking element 19, which is preferably electrically controllable, is disposed in the feed conduit 18 and configured as a blocking valve or a blocking flap which can be moved into open and closed positions and, preferably, moved as well into flow through amount-controlling intermediate positions.

An electronic controlled device 20 is provided which comprises a central microprocessor, data and program memory, and an input and output periphery, these components being connectable with one another via a data bus system. The control device 20 regulates and controls all of the apparatus components which participate in the ammonia ($NH_3$) production process, via the dispatch of corresponding commands to these components concerning their operation or cessation of operation, wherein the control operation runs in a programmed manner configured on the basis of stored data and/or characteristics or, respectively, property fields, as well as the operational actual values provided to the electronic control device. The operation of the control device includes:

switching operations on and off including, as the occasion arises, the operation of the pump 15 via a control conduit 21, controlling the dosing device 13 via a control conduit 22, adjustably positioning the blocking valve 17 via a control conduit 23, adjustably positioning the blocking element 19 via a control conduit 24, controlling the heat output of the heating element 10 via a control conduit 25, and controlling the display or, respectively, the signaling, of the urea fill condition in the supply container 7 via a control conduit 26 assisted by means of the display and/or signal device 27.

In this connection, the electronic control device 20 is provided, via sensors, with monitored actual values such as:

the temperature and, as the occasion arises, the pressure, as well, of the exhaust gas in the exhaust gas conduit 4 at a location upstream of the pre-catalyzer 5, such values provided via a measurement conduit 28, the $NO_x$ content in the exhaust gas collection conduit 2 as provided by a measurement conduit 29, the rate of rotation, the torque moment, and the exhaust gas mass flow of the engine 1 via a measurement conduit 30, the temperature of the exhaust gas branch stream in the feed conduit 18 via a measurement conduit 31, the urea fill condition in the supply container as sensed by a sensor 12 and communicated via a measurement conduit 32, the temperature in the thermal treatment zone of the reaction chamber 9 via a measurement conduit 33, and
the temperature of the exhaust gas in the exhaust gas conduit 4 at the introduction of exhaust gas into the SCR catalyzer 6, via a measurement conduit 34.

The reactor 8 is, in the illustrated embodiment, disposed adjacent to the internal combustion engine and is disposed as close as possible to that certain location at which the feed conduit 18 need only be very short so, as a consequence thereof, the heat loss of the branched-off exhaust gas partial stream until its entrance into the reaction chamber 9 is as small as possible, whereupon practically the entire potential of the heat content of the exhaust gas partial stream to correspondingly reduce the heat output requirements of the heating element can be exploited.

Figure 2:
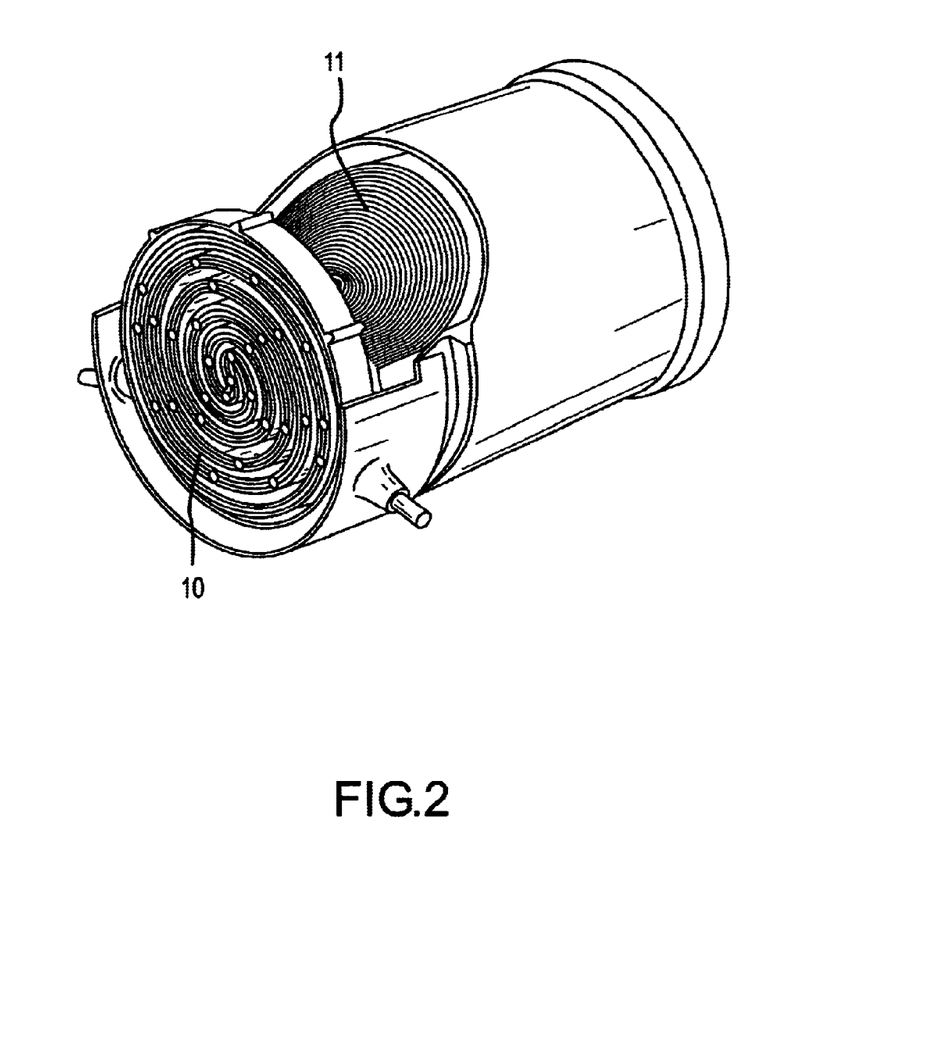
FIG. 2 is a view of an embodiment of a heated hydrolysis catalyst of the company EMITEC.

The electric heating element 10 can be configured in various ways and can be, as well, disposed in various regions of the reaction chamber 8. Thus, for example, the heating element can be configured as a spiral-shaped winding body or a plate-shaped heating body or a ribbed-shaped heating body. The electrically heated surface of the heating element 10 can be positioned immediately before the rear surface of the hydrolysis catalyzer 11 (as shown in FIG. 1) or—as shown in FIG. 2, can be integrated within the hydrolysis catalyzer 11. The temperature of the heated metal surface of the heating element 10 is disposed, via corresponding temperature control from the control device 20, in a region between 200° C. and 450° C. at a value sufficiently high as to ensure, in connection with the spontaneous vaporization of the urea introduced into the reaction chamber 9, no solid remnants remain behind. Moreover, the electrically heated metal surface of the heating element 10 can have a catalytic coating which lowers the decomposition temperature of the urea. The heating surface of the heating element 10 basically has a heat capacity such that the heat withdrawn from the heating element via the spontaneous vaporization of the maximum urea amount does not cause the heating element temperature to sink below a threshold which would otherwise lead to an incomplete vaporization of urea with the thereto attendant solid remnants. A feed conduit 36 extends from the outlet zone 35 of the reactor 8, in which the reaction products ammonia ($NH_3$) and carbon dioxide ($CO_2$) are collected, the feed conduit 36 feeding the products of reaction to the exhaust gas conduit 4, at which an end of the feed conduit 36 configured as a nozzle or having a nozzle 37 introduces such products into the exhaust gas conduit 4. The ammonia ($NH_3$)/carbon dioxide ($CO_2$) gas mixture produced in the reactor 8 is, immediately after its production, fed via the feed conduit 36 and the nozzle 37, at a location downstream of, and adjacent to, the pre-catalyzer 5, into the exhaust gas conduit 4 so that the entire remaining extent between the injection location and the entrance into the SCR catalyzer 6 can be exploited for homogenization of the reduction means ammonia ($NH_3$) in the exhaust gas stream.

The time points at which a value-optimized amount of the reduction means ammonia ($NH_3$), which is necessary for an optimal nitrogen reduction to be effected via the SCR catalyzer 6, must be produced, are controlled by the control device 20 based upon the actual condition values inputted thereto, or based upon calculations performed by the control device, and the control device controls how the components 10, 13, 15, 17, and 19 of the apparatus must be correspondingly activated or, respectively, de-activated. In this connection, as well, a continuous or a discontinuous dosing mode for the feed of urea into the reactor 8 can be selected as a function of the type of dosing device 13.

The inventive apparatus thus implements the inventive method to produce ammonia ($NH_3$) in a manner such that dry urea is fed from the supply container 7 in a controlled amount into the reactor 8 and is subjected thereat to a rapid thermal treatment—that is, a spontaneous reaction, which effects the decomposition of the urea into ammonia ($NH_3$) and isocyanic acid (HCNO), and the gas mixture thus produced is immediately treated in a catalytic manner in the presence of water such that the resulting isocyanic acid (HCNO) is converted via quantitative hydrolysis treatment into ammonia ($NH_3$) and carbon dioxide ($CO_2$). The ammonia ($NH_3$) thus obtained is immediately introduced thereafter as a reduction means into an exhaust gas stream produced by a combustion process of a motor, a gas turbine, or a burner, for selective catalytic reduction of the exhaust gas. The urea, which is stored as a granulate, a powder, or a prill form in the supply container 7, is channeled via the dosing device 13, with the assistance of a transport air stream, into the reactor 8. In the reaction chamber 9 of the reactor, there follows the rapid thermal treatment of the urea on an electrically heated metal surface 10 to produce a spontaneous vaporization of the urea, whereby the electrically heated metal surface of the heating element 10 can have a catalytic coating which reduces the decomposition temperature of the urea. The temperature of the electrically heated metal surface of the heating element 10 is adjustably set at between 200° C. and 450° C. at a value such that the urea is fully vaporized by the rapid thermal treatment—that is, the urea is vaporized without leaving any solid remnants. The water required for the catalytic hydrolysis treatment of the isocyanic acid (HCNO) in the reactor 8 can be made available via an exhaust gas stream which is fed to the reactor. The quantity of this exhaust gas stream is controlled in dependence upon the exhaust gas temperature such that, in the event of an exhaust gas temperature above the urea decomposition temperature provided to reduce the necessary electrical heat output, a relatively larger exhaust gas stream is fed into the reactor 8 as compared to the exhaust gas stream fed into the reactor 8 in the event of an exhaust gas temperature below the urea decomposition temperature.

In connection with the deployment of the inventive apparatus and the inventive process in the space adjacent an internal combustion engine, a gas turbine, or a burner of a stationary facility such as a block heating facility or an emergency electrical current facility or of a mobile facility such as a motor vehicle, a commercial vehicle, a locomotive, a ship, a boat, or an aircraft, an exhaust gas partial stream is branched from the main exhaust gas stream resulting from the combustion process and fed in a set or controlled amount into the reactor 8 and the water portion of the fed-in exhaust gas partial stream is available for the catalytic hydrolysis treatment of the isocyanic acid (HCNO), which has been generated by the rapid thermal treatment in addition to the ammonia ($NH_3$), wherein the catalytic hydrolysis treatment of the isocyanic acid (HCNO) generates ammonia ($NH_3$) and carbon dioxide. The gas mixture produced therefrom is immediately transported away from the reactor 8 and is injected into the exhaust gas conduit 4, which guides the main exhaust gas flow, at a location thereat upstream of an SCR catalyzer 6 or several SCR catalyzer modules, built into a muffler and disposed for exhaust gas flow therethrough in a parallel manner, whereby ammonia ($NH_3$) in the SCR catalyst system is reinforced as the reduction means for the reduction of nitric oxide.

The specification incorporates by reference the disclosure of German priority document 102 060 28.2 filed Feb. 14, 2002.

The present invention is, of course, in no way restricted to the specific disclosure of the specification and drawings, but also encompasses any modifications within the scope of the appended claims.

What is claimed is:

1. An apparatus for producing ammonia ($NH_3$) and introducing the produced ammonia ($NH_3$) into an exhaust gas stream as a reduction means for selectively catalytically reducing nitric oxide contained in the exhaust gas stream, which is an exhaust stream generated by the combustion process of a motor, a gas turbine, or a burner, the apparatus comprising:

a storage container in which urea in dry form in the form of powder, granulate, or micro-prills is stored;

a reactor for the production of ammonia ($NH_3$) and having a heated reaction chamber which is partitioned into a thermal treatment zone and a hydrolysis treatment zone, and the reaction chamber of the reactor being disposed for the treatment therein of an exhaust gas stream from the combustion exhaust gases of a selected one of an internal combustion engine, a gas turbine, and a burner;

a device for feed of the urea, preferably in controlled or measured amounts, from the supply container into the reaction chamber of the reactor;

an electrical heating element in the thermal treatment zone of the reaction chamber of the reactor;

a device for controlling the temperature of the heating element in a manner such that the urea introduced into the reaction chamber is spontaneously de-composeable, via flash hydrolysis, into ammonia ($NH_3$) and isocyanic acid (HCNO);

a device for introducing water in at least one form of completely liquid water and a water-containing gas- into the reaction chamber of the reactor, the device for introducing water includes a feed conduit and an electrically controllable blocking valve in the feed conduit and moveable between open and closed positions and, preferably, movable as well into flow through amount-controlling intermediate positions, the movement of the blocking valve into its respective positions being controllable by the device for controlling the temperature of the heating element; and a hydrolysis catalyzer in the hydrolysis treatment zone of the reaction chamber of the reactor for converting, in the presence of water, the isocyanic acid (HCNO), which is produced from the flash hydrolysis of the urea in addition to ammonia ($NH_3$), into ammonia ($NH_3$) and carbon dioxide ($CO_2$), wherein the apparatus is operable to produce ammonia ($NH_3$) for use thereof as a reducing means in the selective catalytic reduction of the nitrogen oxides contained in exhaust gas of an internal combustion engine, a gas turbine, or a burner of a stationary facility such as a block heating facility or an emergency electrical current facility or a mobile facility such as a motor vehicle, a commercial vehicle, a locomotive, a ship, a boat, or an aircraft, the reactor being disposed adjacent at least one of the exhaust generating facility and the exhaust gas conduits thereof and further comprising a pre-catalyzer (an oxikat) which, in addition to its function of oxidizing carbon monoxide and hydrocarbons in the exhaust gas, also has the function of significantly raising the portion of $NO_2$ in the exhaust gas, from the pre-catalyzer being located upstream of one of an SCR catalyzer and several SCR catalyzers, built into a muffler and disposed for exhaust gas flow therethrough in a parallel manner, and a feed conduit extending from the reactor, in which the reaction products ammonia ($NH_3$) and carbon dioxide ($CO_2$) are collected, to an exhaust gas conduit of the exhaust gas generating facility, the feed conduit leading the products of reaction to the exhaust gas conduit and introducing such products thereinto substantially immediately after their production at a location downstream of the pre-catalyzer in the neighborhood of the exhaust gas conduit so that the entire remaining extent between the introduction location and the entrance into the respective one of the SCR catalyzer and the several SCR catalyzers can be exploited for homogenization of the reduction means ammonia ($NH_3$) in the exhaust gas stream.

2. An apparatus according to claim 1, and further comprising an electronic control device operable to control the respective components participating in the ammonia ($NH_3$) production process so as to ensure the delivery of an appropriate dosage of ammonia ($NH_3$) introduced into the exhaust gas conduit.

3. A method for producing ammonia ($NH_3$) and introducing the produced ammonia ($NH_3$) into an exhaust gas stream as a reduction means for selectively catalytically reducing nitrogen oxides contained in the exhaust gas stream, which is an exhaust stream generated by the combustion process of a motor, a gas turbine, or a burner, the method comprising:

feeding dry urea from a supply container in a controlled amount to a reactor;

disposing the dry urea in the reactor in contact with a heated metal surface to thereby effect flash pyrolysis resulting in the spontaneous separation of the dry urea into a gas mixture comprising the reaction products of ammonia ($NH_3$) and isocyanic acid (HCNO); and substantially immediately after the flash pyrolysis, catalytically treating the thus produced gas mixture in the presence of water via a quantitative hydrolysis treatment such that the isocyanic acid (HCNO) resulting from the flash pyrolysis is converted into ammonia ($NH_3$) and carbon dioxide ($CO_2$), whereby the water required for the quantitative hydrolysis treatment is comprised solely of a water-containing gas, and completely liquid water condensed from such water-containing gas, flowing in an exhaust gas partial stream that is branched, via an exhaust gas branch conduit, from the main exhaust gas stream resulting from the combustion process, the exhaust gas partial stream and the dry urea being fed in a quantitatively controlled amount into the reactor such that the quantity of water in the exhaust gas partial stream is appropriate for substantially complete conversion of the isocyanic acid (HCNO) resulting from the flash pyrolysis into ammonia ($NH_3$) and carbon dioxide ($CO_2$) with the quantity of the exhaust gas stream which is fed into the reactor being adjustably set as a function of the exhaust gas temperature such that the temperature for conversion is not exceeded; and conducting the ammonia ($NH_3$) and carbon dioxide ($CO_2$) generated by the catalytic hydrolysis treatment of the isocyanic acid (HCNO) into the exhaust gas stream at a location upstream of an SCR catalyzer, whereby ammonia ($NH_3$) in the SCR catalyzer system is reinforced as the reduction means for the reduction of $NO_x$.

4. A method according to claim 3, wherein the urea is stored in the supply container in at least one of a granulate, powder, and prill form, and the step of feeding dry urea from a supply container in a controlled amount to reactor includes feeding dry urea by means of a dosing device with the assistance of an air transport stream into the reactor.

5. A method according to claim 3, wherein disposing the urea into contact with a heated metal surface to thereby effect flash pyrolysis includes disposing the urea into contact with a heated metal surface having a catalytic coating so as to produce a spontaneous conversion of the urea into a gas phase, whereby the catalytic coating of the metal surface lowers the decomposition temperature of the urea.

6. A method according to claim 5, wherein disposing the urea into contact with a heated metal surface includes disposing the urea into contact with a heated metal surface having a temperature in the range between 200° C. and 450° C. such that the urea is substantially completely converted by the flash pyrolysis into a gas phase such that substantially no solid urea remnants are present.

7. A method according to claim 3, wherein the method is performed in a space adjacent an internal combustion engine, a gas turbine, or a burner, in that an exhaust gas partial stream is branched from the main exhaust gas stream resulting from the combustion process and fed in a controlled amount in the reactor, the water portion of the fed-in exhaust gas partial stream being available both for the catalytic hydrolysis of ammonia ($NH_3$) as well as, in addition to the catalytic hydrolysis of ammonia ($NH_3$), the hydrolysis treatment of the isocyanic acid (HCNO) to generate ammonia ($NH_3$) and carbon dioxide ($CO_2$) therefrom, whereby the gas mixture produced thereby is transported away from the reactor and is injected into an exhaust gas conduit which guides the main exhaust gas flow, at a location of the exhaust gas conduit upstream of an SCR catalyzer, whereby the ammonia ($NH_3$) thus provided to the SCR catalyzer system reinforces the reduction of $NO_x$.

8. A method for producing ammonia ($NH_3$) and introducing the produced ammonia ($NH_3$) into an exhaust gas stream as a reduction means for selectively catalytically reducing nitrogen oxides contained in the exhaust gas stream, which is an exhaust stream generated by the combustion process of a motor, a gas turbine, or a burner, the method comprising:

feeding dry urea from a supply container in a controlled amount to a reactor;

disposing the dry urea in the reactor in contact with a heated metal surface to thereby effect flash pyrolysis resulting in the spontaneous separation of the dry urea into a gas mixture comprising the reaction products of ammonia ($NH_3$) and isocyanic acid (HCNO); and substantially immediately after the flash pyrolysis, catalytically treating the thus produced gas mixture in the presence of water via a quantitative hydrolysis treatment such that the isocyanic acid (HCNO) resulting from the flash pyrolysis is converted into ammonia ($NH_3$) and carbon dioxide ($CO_2$), whereby the water required for the quantitative hydrolysis treatment is comprised in an exhaust gas partial stream that is branched, via an exhaust gas branch conduit, from the main exhaust gas stream resulting from the combustion process, the exhaust gas partial stream and the dry urea being fed in a quantitatively controlled amount into the reactor such that the quantity of water in the exhaust gas partial stream is appropriate for substantially complete conversion of the isocyanic acid (HCNO) resulting from the flash pyrolysis into ammonia ($NH_3$) and carbon dioxide ($CO_2$), wherein the quantity of water ($H_2O$) comprised in the exhaust gas partial stream that is required for the quantitative hydrolysis treatment of the isocyanic acid (HCNO) is controlled as a function of the exhaust gas treatment such that, in the event that the exhaust gas temperature is greater than the decomposition temperature of the dry urea, the exhaust gas partial stream flowed to the reactor for contact with the heated metal surface therein has a relatively larger mass flow than the exhaust gas partial stream has in the event that the exhaust gas temperature in less than the decomposition temperature of the dry urea, whereby the exhaust gas partial stream having the relatively larger mass flow correspondingly reduces the electricity needed to heat the heated metal surface; and conducting the ammonia ($NH_3$) and the carbon dioxide ($CO_2$) generated by the catalytic hydrolysis treatment of the isocyanic acid (HCNO) into the exhaust gas stream at a location upstream of an SCR catalyzer, whereby ammonia ($NH_3$) in the SCR catalyzer system is reinforced as the reduction means for the reduction of $NO_x$.

9. An apparatus for producing ammonia ($NH_3$) and introducing the produced ammonia ($NH_3$) into an exhaust gas stream as a reduction means for selectively catalytically reducing nitric oxide contained in the exhaust gas stream, which is an exhaust stream generated by the combustion process of a motor, a gas turbine, or a burner, the apparatus comprising:

a storage container in which urea in dry form in the form of powder, granulate, or micro-prills is stored;

a reactor for the production of ammonia ($NH_3$) and having a heated reaction chamber which is partitioned into a thermal treatment zone and a hydrolysis treatment zone, and the reaction chamber of the reactor being disposed for the treatment therein of an exhaust gas stream from the combustion exhaust gases of a selected one of an internal combustion engine, a gas turbine and a burner;

a device for feed of the urea, preferably in controlled or measured amounts, from the supply container into the reaction chamber of the reactor;

an electrical heating element in the thermal treatment zone of the reaction chamber of the reactor;

a device for controlling the temperature of the heating element in a manner such that the urea introduced into the reaction chamber is spontaneously de-composeable, via flash hydrolysis, into ammonia ($NH_3$) and isocyanic acid (HCNO);

a device for introducing water derived solely from a water-containing gas flowing the exhaust gas stream into the reaction chamber of the reactor, the device for introducing water includes a feed conduit and an electrically controllable blocking valve in the feed conduit and moveable between open and closed positions and, preferably, moveable as well into flow through amount-controlling intermediate positions, the movement of the blocking valve into its respective positions being controllable by the device for controlling the temperature of the heating element; and a hydrolysis catalyzer in the hydrolysis treatment zone of the reaction chamber of the reactor for converting, in the presence of water, the isocyanic acid (HCNO), which is produced from the flash hydrolysis of the urea in addition to ammonia ($NH_3$), into ammonia ($NH_3$) and carbon dioxide ($CO_2$).

10. An apparatus according to claim 9, wherein the hydrolysis catalyzer built into the reaction chamber is dimensioned such that a quantitative conversion of the isocyanic acid (HCNO) into ammonia ($NH_3$) and carbon dioxide ($CO_2$) can be effected.

11. An apparatus according to claim 9, wherein the supply container for reserve supply of the urea is sealed against the influences of moisture and high temperatures so that the urea in the supply container neither melts nor, by reason of its hygroscopic properties, adheres to itself.

12. An apparatus according to claim 9, and further comprising a dosing device disposed at a selected one of a location on the supply container and a location adjacent to the supply container, the dosing device being operable to feed the urea via a feed conduit into the reaction chamber of the reactor.

13. An apparatus according to claim 12, wherein the dosing device is disposed at a spacing from the reactor, with its heated reaction chamber, so as to be substantially thermally decoupled from the reactor such that a melting of the urea in the dosing device and in attendant blockage for adhering together of the urea is substantially avoided.

14. An apparatus according to claim 13, wherein the thermal decoupling of the dosing device is supported by an air transport stream, which is preferably produced by an electrically-driven pump or is drawn from another pressurized air source, and the air transport stream is fed to the dosing device and serves, as well, primarily as the transport medium for the urea to be fed into the reaction chamber.

15. An apparatus according to claim 12, and further comprising an electro-magnetically controllable blocking valve disposed in the feed conduit by which the feed along the feed conduit can be blocked during predetermined operational conditions and, thereby, prevent penetration of water into the reactor via the dosing device.

16. An apparatus according to claim 15, and further comprising a pump for producing a transport air stream conducted to the feed conduit for supporting the transport therein of the dry urea and wherein the feed performance of the dosing device and the operation of the pump as well as the activation and de-activation of the blocking valve is controlled via an electric control device.

17. An apparatus according to claim 9, wherein the device for introducing water includes a feed conduit disposed between a donor source having a supply of water and a conduit having exhaust gas therein and an electrically controllable blocking valve movable between open and closed positions and, preferably, movable as well into flow through amount-controlling intermediate positions, the movement of the blocking valve into its respective positions being controllable by an electrical control device.

18. An apparatus according to claim 9, wherein the heating element disposed in the reaction chamber in the reactor for producing the thermal treatment zone is configured as a selected one of a spiral-shaped winding body, a plate-shaped heating body, and a ribbed-shaped heating body.

19. An apparatus according to claim 18, wherein the electrically-heatable surface of the heating element is provided with a catalytic coating operable to reduce the decomposition temperature of the urea and has a heat capacity such that the heat withdrawn from the heating element via the spontaneous vaporization of the maximum urea amount does not cause the heating element temperature to sink below a threshold which would otherwise lead to an incomplete vaporization of urea with the thereto attendant solid remnants.

20. An apparatus according to claim 9, and further comprising a temperature sensor for sensing at least one of the temperature produced in the reaction chamber and the temperature of the heating element, which temperature is monitored by an electronic control device for controlling the temperature of an electronically-heatable heating surface of the heating element in the reaction chamber to be in a range between 200° C. and 450° C. such that, during the spontaneous conversion of the urea into a gas phase, no remnants of the urea remain.

21. An apparatus according to claim 9, wherein the electrically-heatable surface of the heating element in the reaction chamber of the reactor is positioned immediately before the rear surface of the hydrolysis catalyzer.

22. An apparatus according to claim 9, wherein the electrically-heatable surface of the heating element in the reaction chamber of the reactor is integrated in a space-compatible manner in the hydrolysis catalyzer.

* * * * *